(12) United States Patent
Ziemer et al.

(10) Patent No.: US 7,819,775 B2
(45) Date of Patent: Oct. 26, 2010

(54) ARRANGEMENT OF ADJACENT PLANETARY GEARSETS IN A TRANSMISSION

(75) Inventors: Peter Ziemer, Tettnang (DE); Gert Bauknecht, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 331 days.

(21) Appl. No.: 12/186,717

(22) Filed: Aug. 6, 2008

(65) Prior Publication Data

US 2009/0042687 A1     Feb. 12, 2009

(30) Foreign Application Priority Data

Aug. 9, 2007   (DE) .................. 10 2007 037 531

(51) Int. Cl.
*F16H 57/08*   (2006.01)
(52) U.S. Cl. ...................................... 475/331
(58) Field of Classification Search .............. None
See application file for complete search history.

(56) References Cited

U.S. PATENT DOCUMENTS

| 3,316,035 | A | 4/1967 | Zuber |
| 3,730,022 | A | 5/1973 | O'Malley |
| 4,440,282 | A | 4/1984 | Ishimaru et al. |
| 2004/0065169 | A1 | 4/2004 | Ciszak et al. |

FOREIGN PATENT DOCUMENTS

| DE | 19544316 | 5/1996 |
| WO | WO-2006/074707 A1 | 7/2006 |

*Primary Examiner*—Dirk Wright
(74) *Attorney, Agent, or Firm*—Davis & Bujold, P.L.L.C.

(57) ABSTRACT

An arrangement of two adjacent planetary gearsets (1, 2) in a housing of a transmission of a vehicle. In the arrangement a ring gear carrier (3) is connected to ring gear (19) of the first planetary gearset (1) and a sun gear (8) of the second planetary gearset (2), which is connected to a shaft (5) of the transmission, such that torque is transferred between the ring gear (19) of the first planetary gearset (1) and the shaft of the transmission (5). The ring gear carrier (3) is therefore engaged both with the shaft (5) of the transmission and with the sun gear (8) of the second planetary gearset (2).

12 Claims, 1 Drawing Sheet

ARRANGEMENT OF ADJACENT PLANETARY GEARSETS IN A TRANSMISSION

This application claims priority from German Application Serial No. 10 2007 037 531.1 filed Aug. 9, 2007.

FIELD OF THE INVENTION

The present invention concerns an arrangement of adjacent planetary gearsets in a housing of a transmission of a vehicle.

BACKGROUND OF THE INVENTION

From automotive technology, automatic transmissions of planetary structure are in such automatic transmissions, for example a ring gear carrier of a second planetary gearset is connected to a sun gear of the adjacent third planetary gearset, the ring gear carrier of the second planetary gearset being welded to the sun gear of the third planetary gearset.

To transfer torque from the sun gear of the third planetary gearset, or from the ring gear of the second planetary gearset welded to it, to a shaft connected to a clutch, teeth are provided on the inside diameter of the sun gear of the third planetary gearset, which engage with outer teeth on the shaft. In this way, three power-transfer paths for torque transmission are created in the automatic transmission.

It has been found that the sun gear of the third planetary gearset takes up a lot of structural space because of the necessary teeth between the sun gear and the shaft, and this also increases the weight of the sun gear. In addition, by virtue of the design of this known arrangement, cost-intensive oblique bores are necessary for supplying lubricating oil to the sun gear. Moreover, the ring gear carrier of the second planetary gearset is subjected to circumferential and axial forces which are supported by the cost-intensive and often quality-critical weld joint between the sun gear and the ring gear carrier. Both the weld joint and the teeth must be designed to withstand the maximum torque to be transmitted.

Accordingly, the purpose of the present invention is to provide an improved arrangement of adjacent planetary gearsets in a transmission of a generic type described at the start, the arrangement being less costly, qualitatively superior and having lower weight.

SUMMARY OF THE INVENTION

Accordingly, an arrangement of the two adjacent planetary gearsets in a housing of a transmission of a vehicle is proposed in which a ring gear carrier connected to a ring gear of the first planetary gearset with a sun gear of the second planetary gearset, are connected to a shaft of the transmission for torque transfer. The ring gear carrier is connected directly both to the shaft and to the sun gear of the second planetary gearset.

With the arrangement, according to the invention, the necessary power-transfer paths between the adjacent planetary gearsets can be produced in a structurally particularly simply designed manner in which the design of the ring gear carrier and the sun gear of the adjacent planetary gearset are optimized in relation to weight and cost.

This is achieved, in particular, with the arrangement according to the invention, of the ring gear carrier being connected directly to the shaft with a positively interlocking connection and, in addition, the adjacent sun gear is, in turn, coupled to the ring gear carrier by a further positively interlocking connection.

To provide the positively interlocking connection between the shaft and the ring gear carrier, the ring gear carrier can have a sleeve area or suchlike formed on it in the axial direction, whose inside diameter is connected with the shaft by way of locking teeth or suchlike. In this way, a torque can be transmitted from the ring gear carrier of the second planetary gearset to the shaft by the teeth. The locking teeth, plug teeth, splines or suchlike can be provided. Other positive-lock connections too can be envisaged.

For the torque transfer between the ring gear carrier, the sun gear and the shaft, according to another embodiment, it can be provided that the sun gear of the second planetary gearset has on its axial side facing toward the ring gear carrier spur gearing or suchlike, which engages with recesses or suchlike in the ring gear carrier. In this way power-transfer paths for torque transmission between the sun gear and the shaft or ring gear carrier can be produced.

In a further embodiment of the invention, the recesses can consist of windows or suchlike distributed around the circumference of the ring gear carrier, in which the spur teeth or crown teeth of the sun gear can engage. Other positive-lock connections too can be envisaged.

To provide oil supply in a particularly simple manner in the arrangement, according to the invention, at least one gap between two adjacent teeth of the spur gearing can be made deeper in the axial direction. Through this axially deeper gap lubricating oil can be transported in the radial direction outward within the housing of the transmission so that an otherwise cost-intensive oblique bore in the sun gear can be omitted. It is also possible to provide several gaps distributed around the circumference to optimize the lubricating oil supply.

According to another embodiment of the invention, in the arrangement according to the invention for transferring torque between the ring gear carrier and the sun gear, the ring gear carrier can have at least one axially directed projection or suchlike which engages with drive gearing, preferably locking teeth of the adjacent sun gear that extend in the axial direction. In this embodiment, it is advantageous that the already existing locking teeth of the sun gear can be used so that no additional teeth are needed on the sun gear.

Preferably, the projections can be several extensions or suchlike distributed around the circumference of the ring gear carrier. For example, a corresponding extension can be provided on the ring gear carrier for every third tooth of the locking tooth array.

In the design embodiment described above, it is advantageous for the lubricating oil supply if at least one transverse bore in the radial direction is provided in the sun gear. This eliminates the need for the otherwise necessary oblique bores in the sun gear.

In the arrangement according to the invention, to fix the ring gear carrier and the sun gear axially within the transmission, two axial bearings are provided; one such axial bearing arranged on the ring gear carrier side on the side of the ring gear carrier facing away from the sun gear, and another axial bearing arranged on the sun gear side on the side of the sun gear facing away from the ring gear carrier. A further design simplification of the sun gear can be achieved by supporting the axial bearing on the sun gear side, on the sun gear by way of a support disk or suchlike. In this design version, the sun gear can be made as an inexpensive tubular component.

This arrangement, according to the invention, can be used for example in an eight-gear automatic transmission as known from WO 2006/074707 A1 by the present Applicant. In this case, for example, the ring gear carrier of the planetary gearset "RS4" coupled to the sun gear of the planetary gearset "RS2" can be connected to a hollow shaft which is in active connection with a shift element "E" made as a clutch. However, other applications as well are possible.

BRIEF DESCRIPTION OF THE DRAWINGS

The invention will now be described, by way of example, with reference to the accompanying drawings in which.

DETAILED DESCRIPTION OF THE INVENTION

Figure 1:
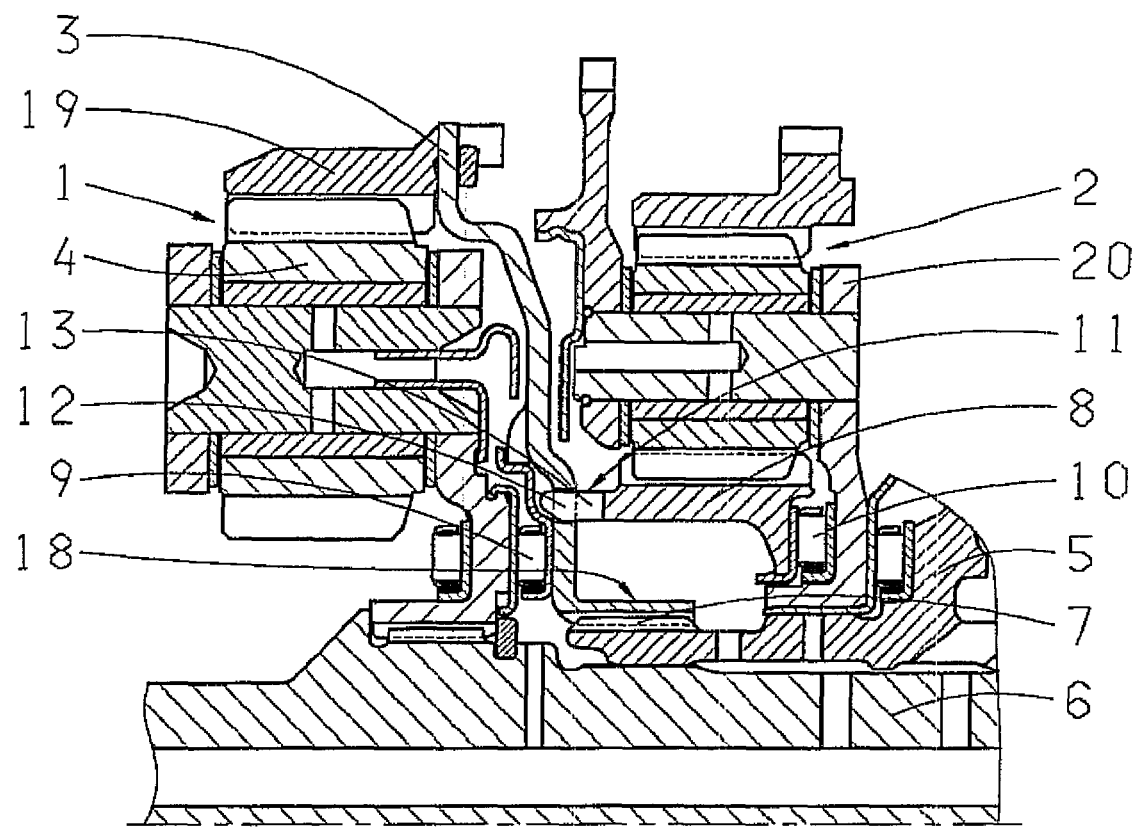
FIG. 1 is a schematic, sectioned partial view of a design embodiment of two adjacent planetary gearsets of a transmission.
Figure 2:
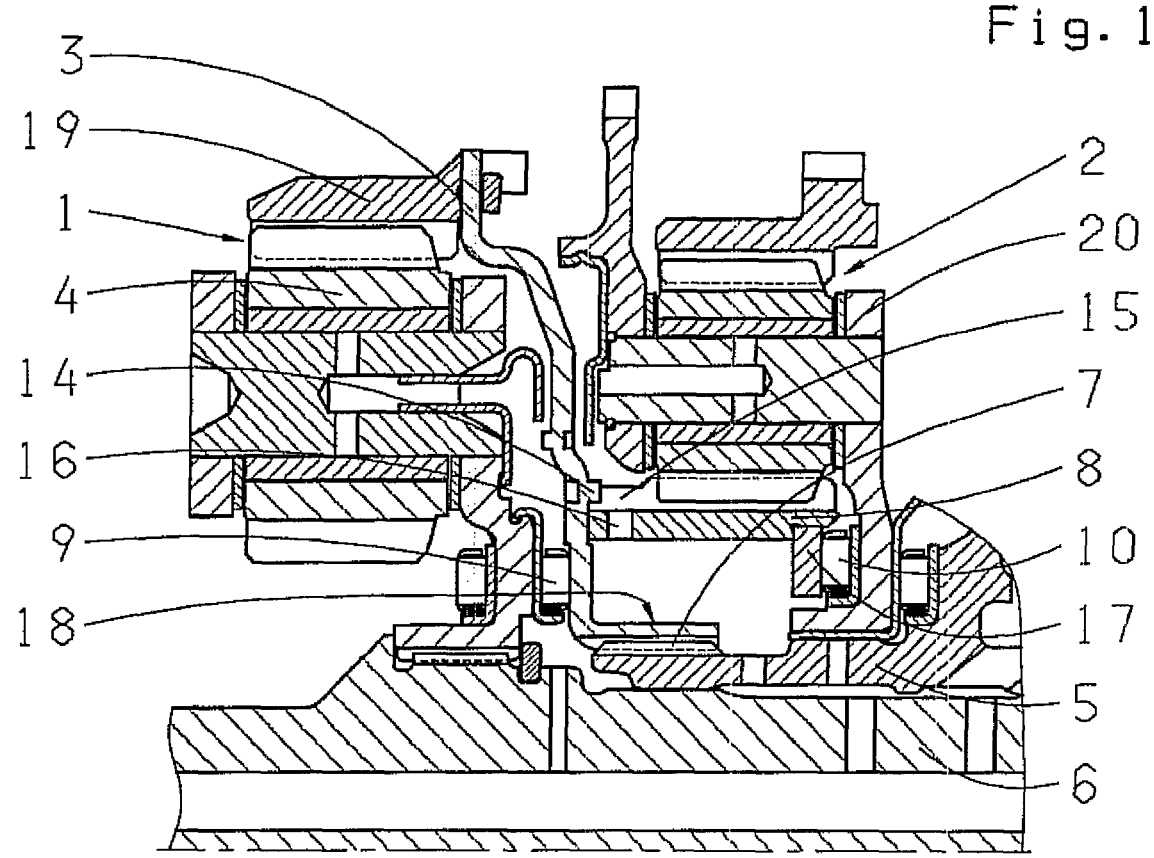
FIG. 2 is a schematic, sectioned partial view of another design embodiment of the arrangement shown in FIG. 1.

FIGS. 1 and 2 show respective possible design embodiments of an arrangement, according to the invention, of two adjacent planetary gearsets of an automatic transmission of a vehicle. Only the components necessary for understanding the invention are described and indexed.

In these two design embodiments, a first planetary gearset 1 and a second planetary gearset 2 are shown as examples for other planetary gearsets. The first planetary gearset 1 is connected with a hollow shaft 5 by positive locking through a ring gear carrier 3, which is in a rotationally fixed manner with a ring gear 19 of the first planetary gearset 1 that engages with planetary gears 4 of the second planetary gearset 2. This hollow shaft 5 is mechanically connected to a clutch (not shown). In addition, the hollow shaft 5 is arranged co-axially with a drive input shaft 6 of the transmission.

The positive-lock connection between the ring gear carrier 3 and the hollow shaft 5 is formed in the two design embodiments, according to FIGS. 1 and 2, by way of drive teeth 7 made as plug teeth. For this, the ring gear carrier 3 has a sleeve area 18 extending in the axial direction, with inner teeth on its inside diameter which engage with outer teeth of the hollow shaft 5. This forms a first power-transfer path for torque transmission between the ring gear carrier 3 with its ring gear 19 and the clutch in active connection with the hollow shaft 5.

For the axial fixing of the ring gear carrier 3 of the first planetary gearset 1 and a sun gear 8 of the second planetary gearset 2, a first axial bearing 9 and a second axial bearing 10 are provided. The first axial bearing 9 is arranged on the side of the ring gear carrier 3 facing away from the sun gear 8 and the second axial bearing 10 is arranged on the side of the sun gear 8 facing away from the ring gear carrier 3.

In the design embodiment according to FIG. 1, on its axial side facing towards the ring gear carrier 3 the sun gear 8 of the second planetary gearset 2 is provided with spur teeth 11. To form a positive-lock connection with these spur teeth 11 between the ring gear carrier 3 and the sun gear 8, window-like recesses 12 are provided in the ring gear carrier 3 in the area outside the first axial bearing 9 in which the spur teeth 11 of the sun gear 8 engage.

This forms further power-transfer paths for torque transmission. Depending on the design, the ring gear 19 or the sun gear 8 can be centered such that the planetary gears 4 of the first planetary gearset 1 or by planetary gears 20 of the second planetary gearset 2, or by way of the ring gear carrier 3 of the first planetary gearset 1 or by the locking mechanisms in the ring gear carrier 3, the ring gear carrier 3 for its part being centered by the locking teeth 7 on the hollow shaft 5.

To be able to replace the oblique bore in the sun gear 8 required in the known arrangement for the supply of lubricating oil, at least one gap 13 between two adjacent teeth of the spur tooth array 11 is made deeper. This ensures the supply of lubricating oil even without an oblique bore.

FIG. 2 shows another design embodiment of the arrangement according to the invention. In contrast to the design embodiment shown in FIG. 1, the positive-lock connection between the ring gear carrier 3 and the sun gear 8 is formed by extensions as axial projections 14 on the ring gear carrier 3, which preferably engage with already existing, if necessary extended locking teeth 15 of the sun gear 8. The maximum number of such projections 14 corresponds to the number of locking teeth 15. Preferably, such extensions or projections 14 are provided for every third tooth of the locking teeth 15.

In the design embodiment according to FIG. 2, the lubricating oil can be supplied through at least one inexpensively made transverse bore 16 in the sun gear 8. In this design embodiment too, several power-transfer paths are formed by the positive-lock connection between the ring gear carrier 3 and the sun gear 8.

Regardless of the respective design embodiment considered, the second axial bearing 10 arranged on the sun gear side (i.e., on the side of the sun gear 8 facing away from the ring gear carrier 3) can be supported on the sun gear 8 by way of a support disk 17. This enables the sun gear 8 to be made as an inexpensive, tubular component as can be seen particularly clearly in FIG. 2.

REFERENCE NUMERALS 1 first planetary gearset
2 second planetary gearset
3 ring gear carrier
4 planetary gears of the first planetary gearset
5 hollow shaft
6 drive input shaft
7 drive teeth
8 sun gear
9 first axial bearing
10 second axial bearing
11 spur teeth
12 recesses
13 gap
14 projections
15 locking teeth
16 transverse bore
17 support disk
18 sleeve area
19 ring gear of the first planetary gearset
20 planetary gears of the second planetary gearset

The invention claimed is:

1. An arrangement of first and second adjacent planetary gearsets (1, 2) in a housing of a transmission of a vehicle, the arrangement comprising a ring gear carrier (3) being connected to a ring gear (19) of the first planetary gearset (1) and a sun gear (8) of the second planetary gearset (2), which is connected to a shaft (5) of the transmission for transferring torque, and the ring gear carrier (3) being directly connected to both the shaft (5) and to the sun gear (8) of the second planetary gearset (2).

2. The arrangement according to claim 1, wherein the ring gear carrier (3) has a sleeve area (18) formed thereon that extends in an axial direction and an inside diameter of the sleeve area (18) is connected to the shaft (5) by drive teeth (7).

3. The arrangement according to claim 1, wherein the sun gear (8) of the secondary planetary gearset (2) has, on an axial side facing toward the ring gear carrier (3), a spur gearing (11) which engages with corresponding recesses (12) on the ring gear carrier (3).

4. The arrangement according to claim 3, wherein the recesses (12) are windows distributed around a circumference of the ring gear carrier (3) with which teeth of the spur gearing (11) of the sun gear (8) engage.

5. The arrangement according to claim 4, wherein at least one gap (13) between two adjacent teeth of the spur gearing (11) is made axially deeper.

6. The arrangement according to claim 1, wherein the annular gear carrier (3) has at least one axially directed projection (14) which extends in an axial direction and engages with one of drive teeth and locking teeth (15) of the sun gear (8) of the second planetary gearset (2).

7. The arrangement according to claim 6, wherein the projections (14) comprise several extensions distributed around a circumference of the ring gear carrier (3).

8. The arrangement according to claim 6, wherein at least one radial transverse bore (16) is located in the sun gear (8) for supplying oil.

9. The arrangement according to claim 1, wherein the ring gear carrier (3) and the adjacent sun gear (8) are fixed in an axial direction by first and second axial bearings (9, 10).

10. The arrangement according to claim 9, wherein the second axial bearing (10) is supported on a side of the sun gear against the sun gear (8) by a support disk (17).

11. The arrangement according to claim 1, wherein the transmission is an eight-gear automatic transmission and the ring gear carrier (3) of the first planetary gearset (1), coupled to the sun gear (8) of the second planetary gearset (2), is connected to the shaft (5) which is hollow and actively connected with a clutch of the automatic transmission.

12. An arrangement of first and second adjacent planetary gearsets (1, 2) in a housing of a transmission of a vehicle, the arrangement comprising:

the first planetary gearset (1) including a ring gear (19) which is fixed to a ring gear carrier (3), having an axially extending portion (18) and a radially extending portion, and the first planetary gearset (1) is supported by a first shaft (6);

the second planetary gearset (2) including a sun gear (8) being supported by a second shaft (5) that is coaxial with the first shaft (6) such that the first planetary gearset (1) and the second planetary gearset (2) are coaxial with one another;

the ring gear carrier (3) of the first planetary gearset (1) having one of a plurality of apertures (12) and a plurality of axial projections (14) distributed around a circumference of the radially extending portion, and the sun gear (8) of the second planetary gearset (2) having one of a plurality of spur teeth (11) and a plurality of locking teeth (15) such that one of the spur teeth (11) engage the apertures (12) and the locking teeth (15) engage axial projections (14) such that the ring gear (19) of the first planetary gearset (1) engages the sun gear (8) of the second planetary gearset (2);

the axially extending portion (18) of the ring gear carrier (3) of the first planetary gearset (1) engages the second hollow shaft (5) such that the ring gear (19) of the first planetary gearset (1) engages the second hollow shaft (5); and the radially extending portion of the ring gear carrier (3) of the first planetary gearset (1) is axially located between the first planetary gearset (1) and the second planetary gearset (2).

* * * * *